US012652289B2

(12) United States Patent
Balazs et al.

(10) Patent No.: US 12,652,289 B2
(45) Date of Patent: Jun. 9, 2026

(54) WEB 3.0 OBJECT REPUTATION

(71) Applicant: Cujo LLC, Walnut, CA (US)

(72) Inventors: Zoltan Balazs, Budapest (HU); Andras Tevesz, Győr (HU); Christian Kiss-Toth, Budapest (HU); Santeri Kangas, Espoo (FI)

(73) Assignee: Cujo LLC, Covina, CA (US)

( * ) Notice: Subject to any disclaimer, the term of this patent is extended or adjusted under 35 U.S.C. 154(b) by 708 days.

(21) Appl. No.: 17/958,524

(22) Filed: Oct. 3, 2022

(65) Prior Publication Data

US 2024/0114038 A1 Apr. 4, 2024

(51) Int. Cl.
*H04L 9/40* (2022.01)
*G06F 40/279* (2020.01)

(52) U.S. Cl.
CPC ........ *H04L 63/1408* (2013.01); *G06F 40/279* (2020.01); *H04L 63/1441* (2013.01)

(58) Field of Classification Search
CPC ... G06F 40/279; H04L 63/1483; H04L 63/14; H04L 63/1408; H04L 63/1433; H04L 63/1441
See application file for complete search history.

(56) References Cited

U.S. PATENT DOCUMENTS 6,862,629 B1 * 3/2005 Hericourt .............. H04L 67/564
709/224
10,915,641 B2 2/2021 Smith et al.

2006/0253584 A1 * 11/2006 Dixon ................. H04L 63/1441
709/225
2011/0023096 A1 1/2011 Xiao et al.
2015/0163236 A1 * 6/2015 Niemela ............. H04L 63/1483
726/23
2015/0227897 A1 * 8/2015 Loera ................. G06Q 20/0855
347/5
2017/0193513 A1 7/2017 Zand-Biglari
2019/0386969 A1 12/2019 Verzun et al.

(Continued)

FOREIGN PATENT DOCUMENTS

CN 109978517 A 7/2019
CN 113327108 A 8/2021

OTHER PUBLICATIONS

Author Unknown, "Machine Learning and Real-Time Fraud Detection in Web3 Demystified," AnChain.AI, https://anchain.ai/blog/ml-and-real-time-fraud-detection-in-web3/, Jul. 11, 2017, 6 pages.

(Continued)

*Primary Examiner* — Joseph G Ustaris
(74) *Attorney, Agent, or Firm* — Dority & Manning, P.A.

(57) ABSTRACT

A method, apparatus, and a computer-readable medium for a web object reputation processing, especially in Web3. The method includes: intercepting data transmitted in a data connection related to a current decentralized application running in a user apparatus, wherein the current decentralized application comprises a frontend implementing a web user interface for a user of the user apparatus, and a backend implemented as a smart contract; determining a reputation of a web object related to the frontend of the current decentralized application; and in response to determining that the reputation of the web object is malicious, blocking the data connection.

20 Claims, 7 Drawing Sheets

(56) References Cited

U.S. PATENT DOCUMENTS

| | | | | |
|---|---|---|---|---|
| 2021/0019827 A1* | 1/2021 | Kim | .................. | G06Q 30/0206 |
| 2021/0110047 A1 | 4/2021 | Fang | | |
| 2021/0334371 A1* | 10/2021 | Ke | ......................... | G06N 5/01 |
| 2022/0067738 A1 | 3/2022 | Fang et al. | | |
| 2022/0067752 A1 | 3/2022 | Fang et al. | | |
| 2023/0401571 A1* | 12/2023 | Lee | ....................... | G06Q 20/12 |

OTHER PUBLICATIONS

Extended European Search Report for EP Patent Application No. 22199452.8, mailed Mar. 13, 2023, 9 pages.
Gore, Ari, "Hello, Web3 Firewall!," https://zengo.com/hello-web3-firewall, Aug. 23, 2022, 11 pages.
Fiszer, Michael-David, "Introducing Clearsign: The Web3 Firewall to Secure your Assets," https://zengo.com/introducing-clearsign-the-web3-firewall-to-secure-your-assets, Jun. 23, 2022, 9 pages.

* cited by examiner

FIG. IA

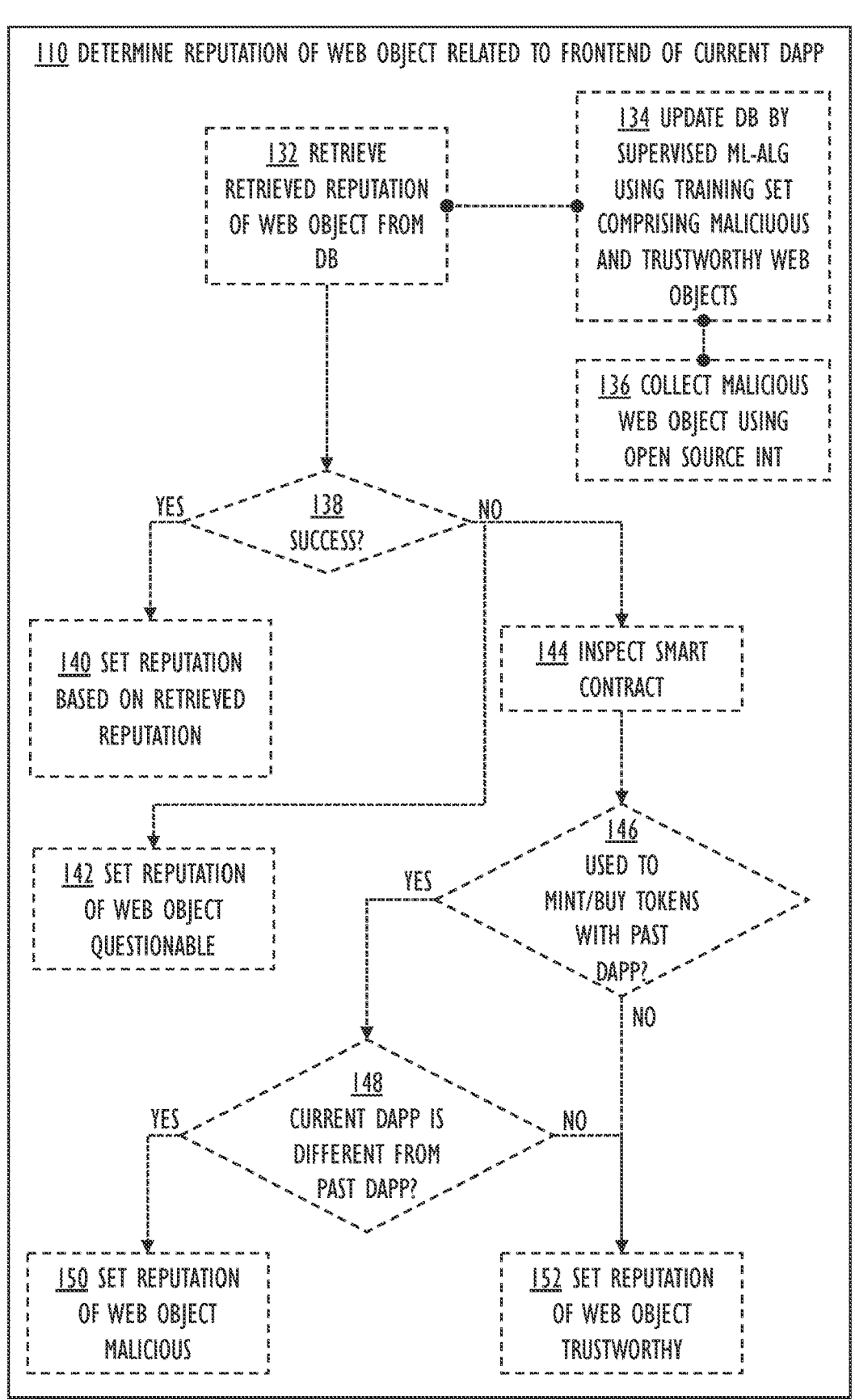

110 DETERMINE REPUTATION OF WEB OBJECT RELATED TO FRONTEND OF CURRENT DAPP

132 RETRIEVE RETRIEVED REPUTATION OF WEB OBJECT FROM DB

134 UPDATE DB BY SUPERVISED ML-ALG USING TRAINING SET COMPRISING MALICIUOUS AND TRUSTWORTHY WEB OBJECTS

136 COLLECT MALICIOUS WEB OBJECT USING OPEN SOURCE INT

138 SUCCESS?

YES          NO

140 SET REPUTATION BASED ON RETRIEVED REPUTATION

144 INSPECT SMART CONTRACT

142 SET REPUTATION OF WEB OBJECT QUESTIONABLE

146 USED TO MINT/BUY TOKENS WITH PAST DAPP?

YES          NO

148 CURRENT DAPP IS DIFFERENT FROM PAST DAPP?

YES          NO

150 SET REPUTATION OF WEB OBJECT MALICIOUS

152 SET REPUTATION OF WEB OBJECT TRUSTWORTHY

FIG. 1B

WEB 3.0 OBJECT REPUTATION

BACKGROUND

In Web 1.0, users connect to websites to read their contents with browsers. In Web 2.0, users actively create contents (in a social media, for example) for others to read, and authenticate themselves with user identifiers and passwords. In Web 3.0 (also known as Web3), users interact with websites that are integrated with smart contracts, and authenticate themselves using a private key stored in a digital wallet. Decentralized applications (or dApps for short) are built without relying on the traditional application logic and layers that exist in Web 2.0. Network nodes, blockchains, and smart contracts are used to manage logic and state. The blockchain does not require actors to be trusted as in Web 2.0, making updates to address security problems harder. Users get to maintain control over their identities, but no intermediaries exist to provide recourse in the event of attacks or key compromises. As Web 3.0 is emerging, its cybersecurity requires further sophistication.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

Figure 1:
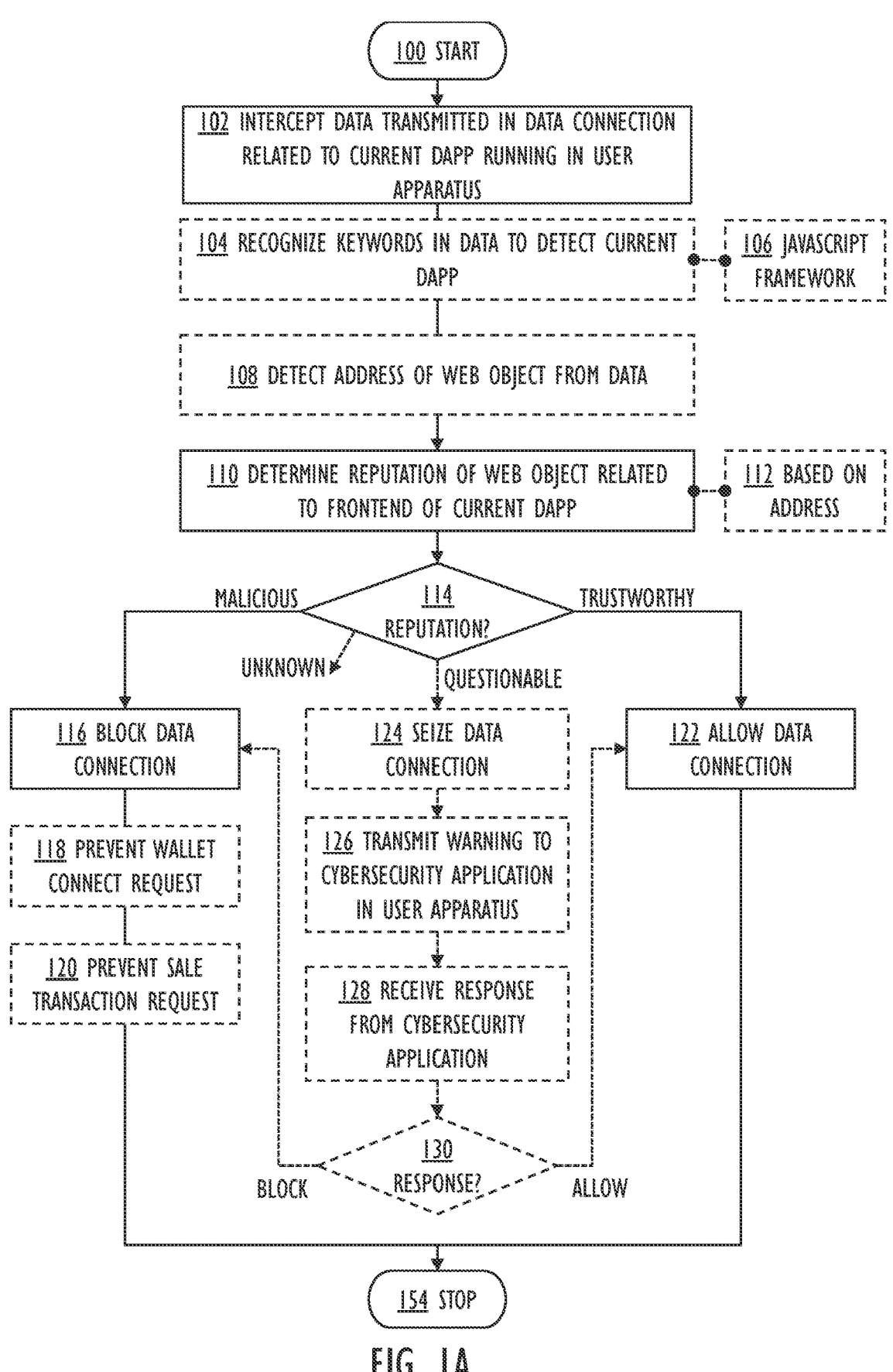
FIG. 1A and FIG. 1B are flowcharts illustrating examples of a method.

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

In Web3, blockchains, smart contracts, and tokens, are some of the evolving key technologies, which operate in a decentralized manner. Cybersecurity is challenging, as Web3 is missing a single source or truth. Decentralized applications, operate in Web3 so that network nodes, blockchains, and smart contracts are used to manage logic and state. While using the decentralized application, the user may be required to sign a transaction using his/her private keys managed with a digital cryptocurrency wallet.

The decentralized application comprises a frontend implementing a web user interface for a user of the user apparatus, and a backend implemented as a smart contract. A web object defines an address of a location running the frontend. As the decentralized application executes the backend implemented as the smart contract, the decentralized application may be linked to a blockchain.

If the user is deceived to run a scam frontend created by criminals, assets from the cryptocurrency wallet of the user may be stolen as the scam frontend is connected to the cryptocurrency wallet, and the legitimate backend implements a transaction, such as a sale of a fungible or non-fungible token defined by a legitimate smart contract in the blockchain and accessed by a private key kept in the cryptocurrency wallet of a user of the user apparatus.

There are countless different scams related to cryptocurrencies, but some are more dangerous than others. These scam sites try to convince the users to connect their digital wallets (in Web 2.0 terminology, this is the login to the site) to the decentralized application, and then sign a malicious transaction (in Web 2.0 terminology this is the selling of your assets to scammers).

The total number of people interacting with the Web3 is low today, but it is expected to rise. There are many known cases where non-fungible token NFT prices have been inflated via selling the NFT to myself on an incredible high price. But people also suffer significant damages through the lost assets. The scam protection is not only related to the NFTs, but to protecting against rogue Web3 decentralized applications in general.

The scams circle around the NFT ownership, but the digital wallets can be used in any type of transactions in the future. Cryptocurrencies operate like cash without any central authority ensuring or proving the validity of the transaction or transacting parties. Even though today it does not seem too important that some people lose ownership of their NFTs, the total estimated damage of such attacks is already in orders of magnitude higher than with regular phishing. The cryptocurrency/blockchain consultants are pushing the technology in the areas of digital art, gaming, Ethereum name service and domains, decentralized finance, NFT marketplace, sports, fashion, and many more to come. It is important to validate the legitimacy and trustworthiness of the entry point/web frontend where the user connects his/her digital wallet. The user should be able to trust the point where they connect their wallet to enable Web3 transactions without violating their privacy.

FIG. 1A illustrates a computer-implemented method.

The method starts in 100 and ends in 154.

The operations are not strictly in chronological order in FIG. 1A and FIG. 1B, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

First, data transmitted in a data connection related to a current decentralized application running in a user apparatus is intercepted 102. The data connection is a (packet-switched) network connection, wherein information is transmitted by sending and receiving. The data connection implements (point-to-point) data communication from the user apparatus to another network node. The data communication is transferred over one or more communication channels (implemented by copper wires, optical fibers, and wireless communication using radio spectrum, for example). The intercepting 102 refers to user-approved lawful interception or monitoring of the data connection, with a purpose and goal of increasing cybersecurity related to the user apparatus and its operating environment. The intercepting 102 may be implemented so that the data connection is passively monitored, i.e., the data connection is not affected by the intercepting. Alternatively, if needed, the intercepting may include a seizing of the data connection, i.e., the data connection is actively influenced so that connection and/or requests are blocked until it may be decided whether a cybersecurity action is required.

Figure 2:
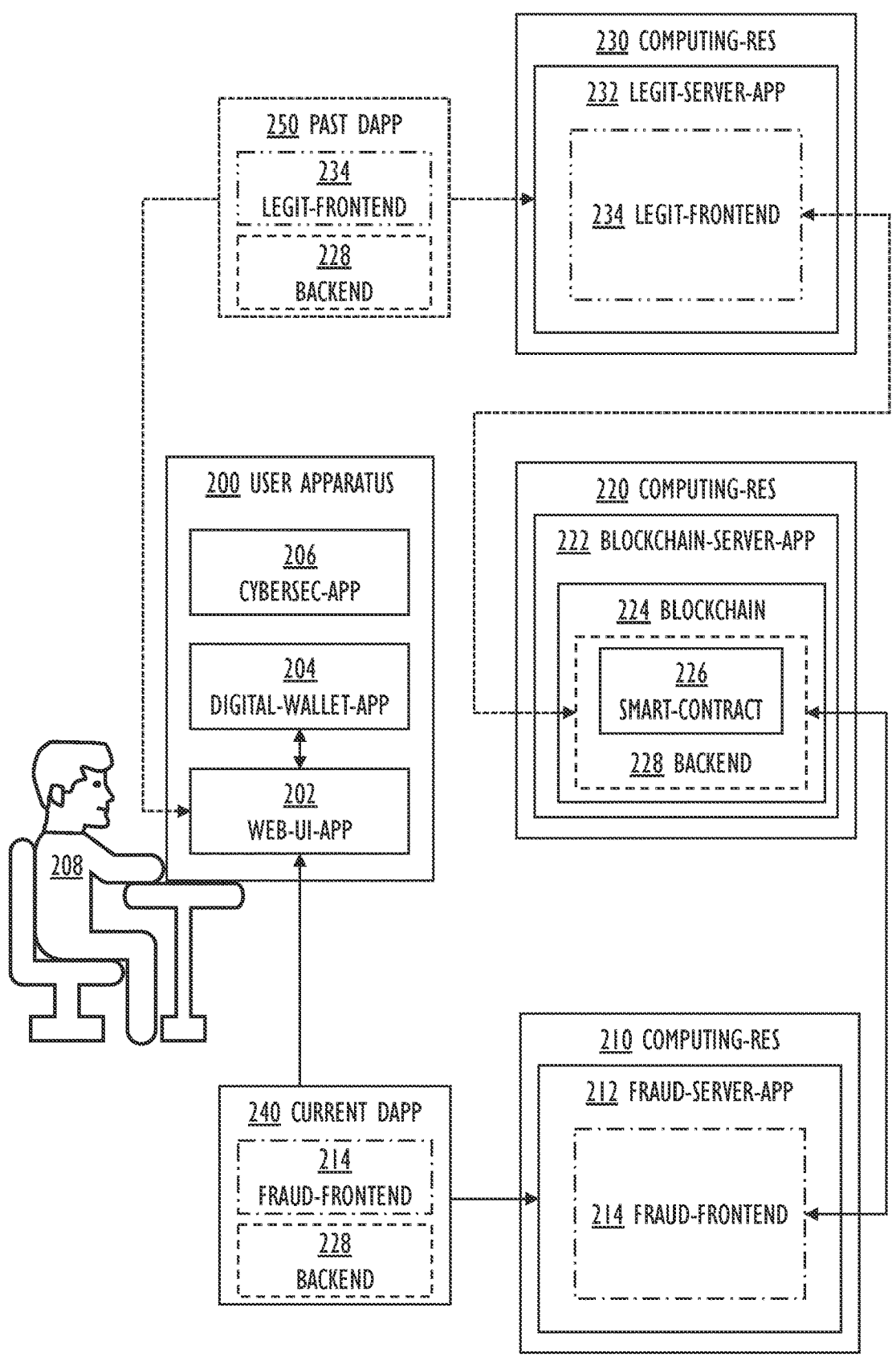
FIG. 2 is a block diagram illustrating an example implementation environment for the method.

FIG. 2 illustrates an example implementation environment for the method.

As already explained, the current decentralized application 240 comprises a frontend 214 implementing a web user interface for a user 208 of the user apparatus 200, and a backend 228 implemented as a smart contract 226. The smart contract 226 may link the current decentralized application 240 to a blockchain 224 operated by a blockchain server application 222.

As used herein, the term "decentralized application" (also known as DApp, dApp, Dapp, or dapp) 240 refers to a type of distributed open source application that exists and runs on a decentralized computing, including a blockchain 224 or other distributed ledger technology (a consensus of replicated, shared, and synchronized digital data), or a peer-to-peer (P2P) network, which all operate in a geographically distributed fashion across many sites instead of a single computer and a centralized database. A typical platform for decentralized applications 240 is Ethereum®, an open source blockchain 224 with a smart contract 226 functionality.

As used herein, the term "smart contract" 226 refers to a program stored on the blockchain 224, and used to automate the execution of an agreement in such a way that all participants will be certain of the outcome, without time loss or a need for an involvement by an intermediary. The smart contract 226 may be implemented with "if/when x event happens, then execute y action"-statements written into code on the blockchain 224. In response to determining that predetermined conditions have been met and verified, the statements are executed by a network of computers 220 to perform desired actions, which may include releasing funds, registering a vehicle, sending notifications, issuing a ticket, or other transactions involving a fungible or a non-fungible token. The blockchain 224 is updated after the transaction is completed, which means that the transaction cannot be changed. The blockchain 224 has four defining features: consensus, replication, immutability, and security. Consensus means that the shared ledger 224 is updated only after the transaction is validated by all relevant participants. Replication means that after a block (=a record of an event)

in the blockchain 224 is approved, it is automatically spread across the ledgers for all relevant participants, and all participants will see a single trusted reality of the transaction. Immutability means that more blocks can be added, but not removed, i.e., a permanent record of every transaction will remain in the blockchain 224. Security means that only authorized entities are allowed to create and access blocks of the blockchain 224, and trusted partners are given access permissions to the blocks.

The frontend 214 is running as a web object and the user apparatus 200 is running a web user interface application 202 to make requests to the web object. The web object comprises elements on a web page, including text, graphics, URLs (Uniform Resource Locator), and scripts. The web user interface application 202 may be a web browser or a mobile app, for example. A digital wallet application 204 managing the digital wallet of the user 208 is also running in the user apparatus 200.

As shown in FIG. 2, the frontend 214 may be running in a server application 212 hosted in a computing resource 220.

Figure 3:
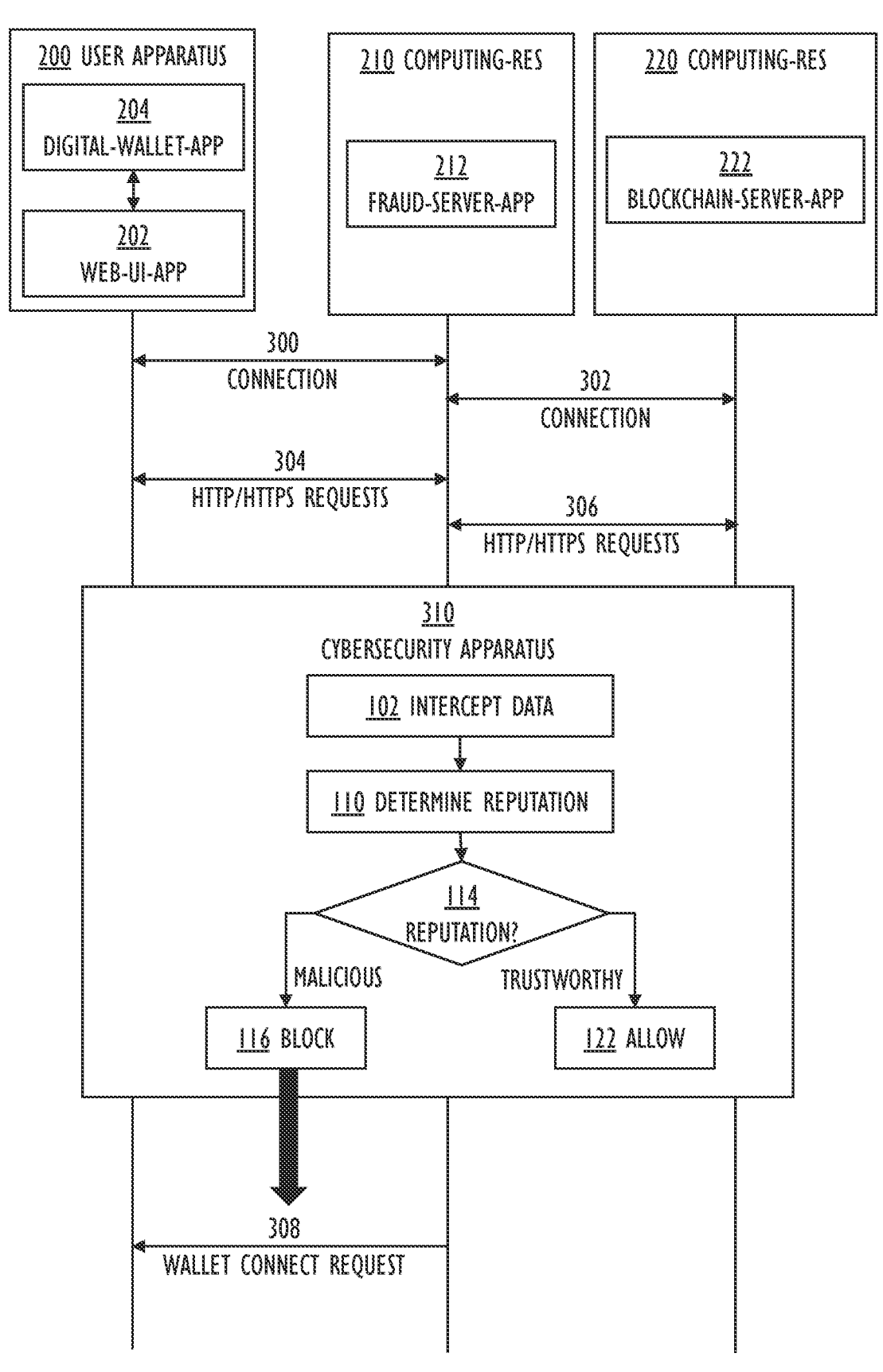
FIG. 3 is a sequence chart illustrating communication between various actors of the method.

FIG. 3 illustrates communication between various actors of the method.

The data connection may first be created using packet protocols to establish a connection 300 between the user apparatus 200 and a computing resource 210 hosting the server application 212.

The packet protocols include, but are not limited to, TCP/IP (Transmission Control Protocol/Internet Protocol), UDP (User Datagram Protocol), and QUIC, which establishes a multiplexed transport on top of the UDP.

Various HTTP/HTTPS (Hypertext Transfer Protocol/Hypertext Transfer Protocol Secure) requests 304 may then be transferred in the connection 300 (using TCP streams or UDP datagrams, for example).

In the Internet protocol suite, the connection 300 is operated in a link layer, an internet layer, and a transport layer, and the requests 304 are operated in an application layer.

Note that the computing resource 210 running the server application implementing the frontend 214 may also need to create a connection 302 with the computing resource 220 running the blockchain server application 222 implementing the backend 228, and then use connection 302 for various HTTP/HTTPS requests 306.

Keywords in the (intercepted) data may be recognized 104 to detect the current decentralized application. For example, from the HTTP/HTTPS requests typical keywords related to a typical decentralized application may be searched for to detect that the data relates to a decentralized application 240 currently running in the user apparatus 200. Such typical keywords may be a collection of keywords used by a JavaScript framework related to the decentralized application 240.

Next, a reputation of a web object related to the frontend 214 of the current decentralized application 240 is determined 110.

In response to determining 110 that the reputation of the web object is malicious, the data connection is blocked 116. In other words, the web object is a Web3 entry point, and as the data connection to the web object of the frontend 214 is blocked, the Web3 entry is blocked, and the fraudulent frontend 214 cannot connect with the legitimate backend 228, causing that the current decentralized application 240 is not allowed to execute.

The determining 110 may be implemented with a test in block 114: if the test indicates that the reputation of the web object is malicious, the data connection is blocked 116, or else if the test indicates that the reputation of the web object is trustworthy, the data connection is allowed 122.

As shown in FIG. 1A, the test in the block 114 may also determine whether the test indicates that the reputation of the web object is questionable. In response to determining 110 that the reputation of the web object is questionable, the data connection is seized 124, and a warning related to the data connection of the current decentralized application 240 is transmitted 126 to a cybersecurity application 206 running in the user apparatus 200. Additionally, a response from the cybersecurity application 206 may be received 128, and based on the response 130, the data connection is allowed 122, or the data connection is blocked 116.

The determining 110 and the testing 114 may utilize a trustworthiness score of the Web3 object (that may be performing a digital wallet connection to the service implemented by the current decentralized application 240). Based on the trustworthiness score, the connection may be blocked (for malicious web objects), the user may be warned (for questionable web objects), and the connection may be allowed (for trustworthy web objects). If there is no earlier knowledge of the web object/entry point, the score is unknown, and further analysis may be needed. A cache of all known entry points and their reputations may be maintained in a cybersecurity apparatus 310. If the reputation is unknown, an analysis of the Web3 entry point may be performed on the fly. The entry point trustworthiness score may be based on an analysis of the website. The site analysis may be performed by a machine learning algorithm. The web user interface application 202 sends multiple separate consecutive requests to the Web3 entry point before the digital wallet of the user 208 is connected. If the score is unknown, the cybersecurity apparatus 310 intercepts every HTTP/HTTPS request again and again. Once the unknown site has been analyzed and a trustworthy score has been generated, the cybersecurity apparatus 310 performs needed cybersecurity operations according to the score.

An address of the web object may be detected 108 from the (intercepted) data. The frontend 214 is running in the web object associated with the address, and the determining 110 of the reputation of the web object related to the frontend 214 of the current decentralized application 240 is based on the address 112. The address comprises one or more of an internet protocol (IP) address, a fully qualified domain name (FQDN), a universal resource locator (URL), and a smart contract address.

FIG. 1B illustrates optional implementation examples for the determining 110 of the reputation of the web object.

A retrieved reputation for the web object is retrieved 132 from a web object reputation database. If the retrieving succeeds, the reputation of the web object related to the frontend 214 of the current decentralized application 240 is set 140 based on the retrieved reputation.

The success of the retrieval may be tested in block 138: If the retrieving succeeds YES, the reputation of the web object is set 140 based on the retrieved reputation, or else if the retrieving fails NO, the reputation of the web object is set questionable.

The web object reputation database is continuously updated 134 by a supervised machine learning algorithm using a training set comprising malicious web objects and trustworthy web objects. The malicious web object is in some way associated with a malicious front end 214, such as being its code or an address, for example. The malicious web objects may be collected using an open source intelligence 136 such as NFT Discord server, Twitter, etc. The training set may include a known list of malicious Web3 entry points and legitimate Web3 entry points. A Web3 site may be considered malicious if there is a trusted, legitimate website X connected to a legitimate smart contract Y, and there is a deceptive website Z which connects to the same legitimate smart contract Y. This is specific to the Web3 world that users need to interact with the legitimate smart contract Y to transfer their NFTs from their digital wallet to a digital wallet of another party.

The features for supervised machine learning algorithm include features extracted from a web crawler (or a spider, which is an internet bot that systematically browses pages and the WWW in general to gather data from a variety of online sources), an age of the site, SSL/TLS (Secure Sockets Layer/Transport Layer Security) certificate trustworthiness utilized by the site, a popularity of the site. The features extracted from the site with the use of Ethereum Provider API include a smart contract deployment date, a number of transactions, a wallet address used to deploy the contract, a domain registration age, etc. The objective is to check that the decentralized application website is legitimate (or to be more precise, that the website running the frontend 214 of the decentralized application is legitimate). The supervised machine learning algorithm learns all the time what the user population of the system is requesting from it, also in a crowd sourcing fashion. Each site, to which any of the users using the system is connecting to, is analyzed and scored in real-time or near real-time. Based on the crawling capability, the system learns all the time about the new sites, which the user population is accessing.

Instead of proceeding to setting 142 the reputation of the web object questionable based on the test 138, an optional branch may be entered, wherein the smart contract is inspected 144.

In response to determining (based on the inspecting 144) that the smart contract has been used to mint or buy one or more fungible tokens or non-fungible tokens (NFT) with a past decentralized application 250, and that the current decentralized application 240 is different from the past decentralized application 250, the reputation of the web object is set 150 malicious.

The result of the inspecting 144 may be implemented as a test in block 146: if the smart contract has been used to mint or buy one or more fungible tokens or non-fungible tokens with a past decentralized application 250, another test in block 148 is entered, or else the reputation of the web object is set 152 trustworthy.

The test in block 148 may be implemented as follows: if the current decentralized application 240 is different from the past decentralized application 250, the reputation of the web object is set 150 malicious, or else the reputation of the web object is set 152 trustworthy.

As illustrated in FIG. 3, subsequent to blocking 116 the data connection, additional cybersecurity operations may be needed.

A wallet connect request from the current decentralized application 240 in the (intercepted) data may be prevented 118, 308. The purpose of the wallet connect request 308 is to connect a cryptocurrency wallet of the user 208 of the user apparatus 200 to the web object related to the current decentralized application 240.

A sale transaction request from the current decentralized application 240 in the (intercepted) data may be prevented 120. The purpose of the sale transaction request is to sell a fungible token or a non-fungible token defined by the smart contract 226 in a blockchain 224 and accessed by a private key kept in a cryptocurrency wallet of the user 208 of the user apparatus 200.

In the examples, an interception of the connection to an entry point is made before the digital wallet is connected the service providers entry point. The network interception points applicable are network elements like a customer-premises equipment (CPE), an end point application network stack (on the local virtual private network, VPN, stack, for example), an end-point device web browser plugin, or the decentralized mobile application.

Figure 4:
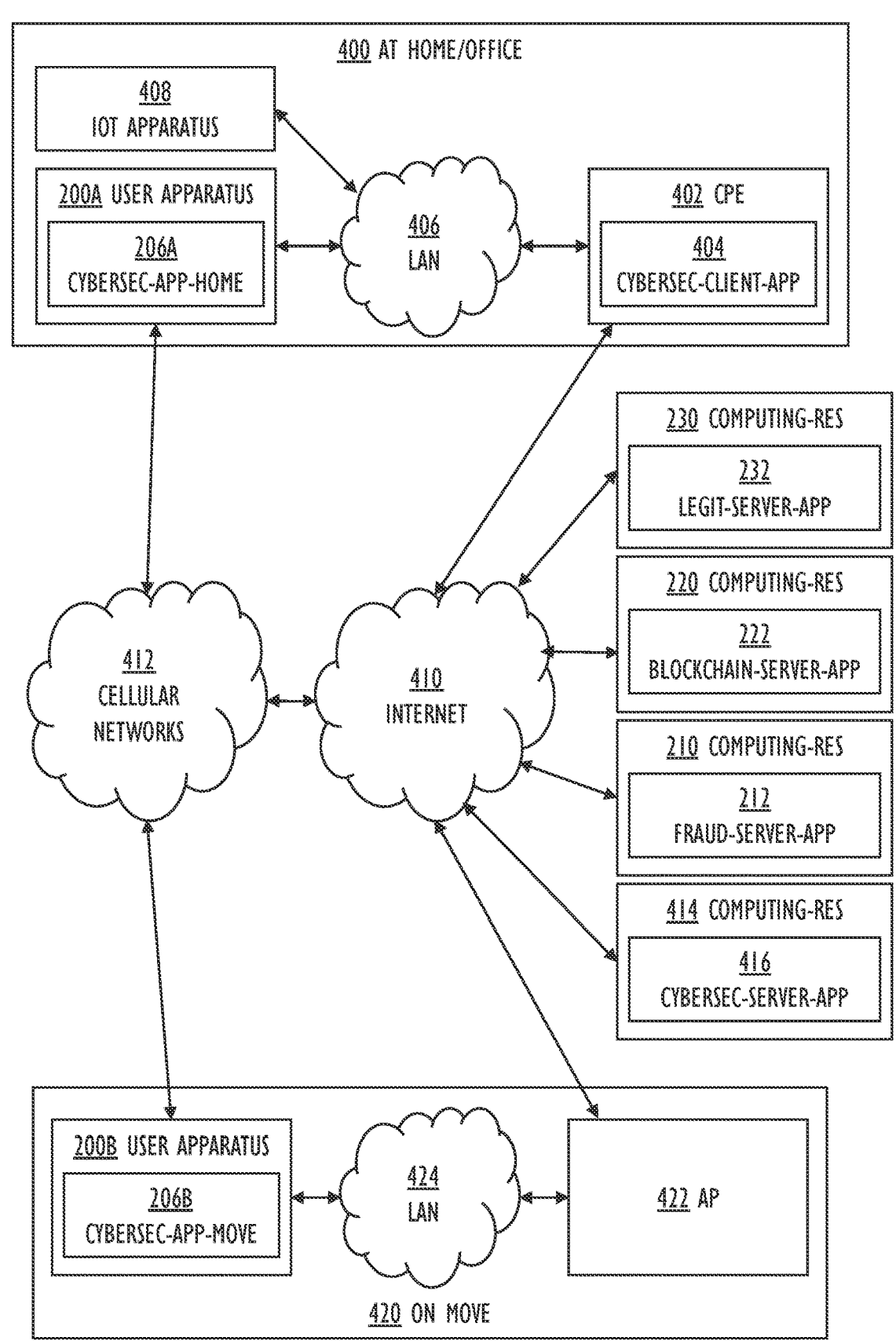
FIG. 4 is a block diagram illustrating an example operation environment.

FIG. 4 illustrates an example operation environment.

Two basic use cases are described: at home or office 400, and on the move 420.

The Internet 410 uses the Internet protocol suite including TCP/IP and UDP to globally connect computer networks so that communication is enabled between user apparatuses 200A, 200B and various services provided typically by server applications 212, 222, 232. The Internet 410 comprises public networks, private networks, academic networks, business networks, government networks, etc. interlinked with various networking technologies. The various services provide access to vast WWW (World Wide Web) resources, wherein webpages may be written with HTML (Hypertext Markup Language) or XML (Extensible Markup Language) and accessed by a browser or another application (such as a mobile app) running in the user apparatus 200A, 200B.

From the cybersecurity point of view, the Internet services may be divided between legitimate services and fraud services, which in the present examples are represented by the legitimate server application implementing a legitimate frontend 234, and the fraud server application 212 implementing the fraud frontend 214. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. In the present examples, the criminal activities are enabled by the fraud frontend 214, which connects to a legitimate backend 228 during the running of the current decentralized application 240. In the past, the user 208 used the legitimate backend 228 with the legitimate frontend 234 during the running of the past decentralized application 250. The legitimate frontend 234 may be running in a server application 232 hosted in a computing resource 230. Note that the computing resources 210, 220, 230 may be the same, partly the same, or different, depending on the implementation environment of the various server applications 212, 222, 232. Note also that different service providers, such as network operators, cloud service operators, blockchain operators, cryptocurrency operators, and cybersecurity operators, just to name a few, may operate and/or manage the computing resources 210, 220, 230 and the server applications 212, 222, 232.

Device identification, which may be defined as a capability to detect various apparatuses, such as the user apparatuses 200A, and IoT (Internet of Things) apparatuses 408 with a home/office LAN 406, also increases the cybersecurity. Traditionally, a MAC (Medium/Media Access Control protocol) address assigned by a device manufacturer and used by wireless radio signals within the LAN has been used for the device identification. However, MAC spoofing, which anonymizes and randomizes the MAC address to increase privacy, hinders the device identification based on the MAC address. Machine learning algorithms may use a number of other data items (such as device-specific unique radio interface characteristics, other current and historic unique identifiers related to the apparatus 200A, 408 and its communication) to enable the device identification despite of the MAC spoofing.

Numerous cellular networks (or mobile networks) 412 provide access to the Internet 410 for the user apparatus 200A, 200B (both at home or office 400 and on the move 420) by providing a wireless link in a radio cell implemented by a base station (or a base transceiver station, an eNodeB (eNB), a gNodeB (gNB), or an access point, for example) implemented using a standard technology, including, but not being limited to a cellular radio network (GSM, GPRS, EGPRS, WCDMA, UMTS, 3GPP, IMT, LTE, LTE-A, 3G, 4G, 5G, 5G NR (5G New Radio), 6G, etc.), a wireless local area network (such as WLAN (Wireless Local Area Network), Wi-Fi, etc.), or a short-range radio network (such as Bluetooth or Bluetooth Low Energy (BLE), etc.). The use of the cellular radio network may necessitate use of a subscriber identity module (SIM), either as a physical chip, or as an embedded-SIM (eSIM), for example.

CPE (Customer-Premises Equipment) 402 is located at home or office 400 of a user of the user apparatus 200A. CPE 402 is stationary equipment connected to a telecommunication circuit of a carrier (such as a broadband service provider) at a demarcation point. The demarcation point may be defined as a point at which the public Internet 410 ends and connects with a LAN (Local Area Network) 406 at the home or office of the user of the user apparatus 200A. In this way, the CPE 402 acts as a network bridge.

CPE 402 may include one or more functionalities of a router, a network switch, a residential gateway, a set-top box, a fixed mobile convergence product, a home networking adapter, an Internet access gateway, or another access product distributing the communication services locally in a residence or in an enterprise via a (typically wireless) LAN and thus enabling the user of the user apparatus 200A to access communication services of the broadband service provider. Note that the CPE 402 may also be implemented with wireless technology, such as a 5G CPE 402 configured to exchange a 5G cellular radio network signal with a base station operated by the broadband service provider, and generate a Wi-Fi (or WLAN) or wired signal to implement the LAN 406 to provide access for the user apparatus 200A. Furthermore, the 5G CPE 402 performs the conversion between the 5G cellular radio network signal and the Wi-Fi or wired signal.

As shown in FIG. 4, besides the one or more user apparatuses 200A, one or more IoT (Internet of Things) apparatuses 408 may be communicatively coupled with the LAN 406. The IoT apparatus 408 may include technology (sensors, communication technology, data processing) to enable smart appliances (lighting systems, thermostats, home security systems, remote health monitoring systems, smart fridges, smart toasters, etc.), IP cameras, or network attached storage (NAS), for example.

On the move 420, the user of the user apparatus 200B may access the Internet 410 via the cellular networks 412, or via a local access point 422 implementing a local area network 424. The access point 422 may be provided with similar technology as used by the CPE 402. The access point 422 may be located at a bus station, at a train station, at an airport, at a hotel room, at a hotel lobby, at a conference or fair center, at a shopping mall, at a cafe, at a museum, at a rented apartment, or at another public or private location.

Figure 5A:
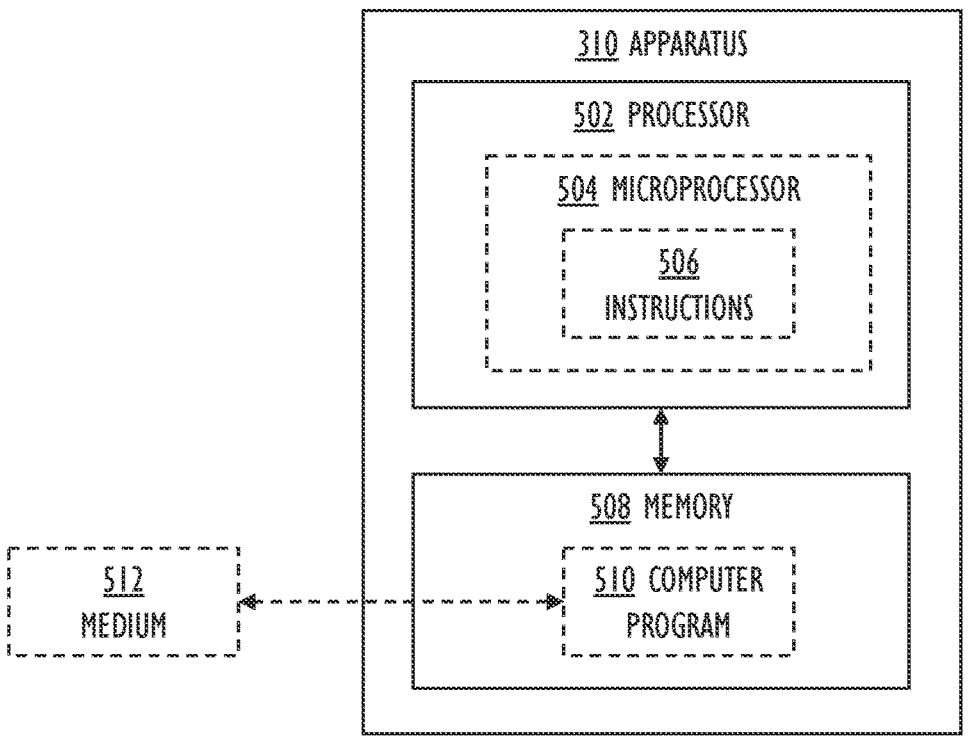
FIG. 5A and FIG. 5B are block diagrams illustrating examples of a cybersecurity apparatus.
Figure 5B:
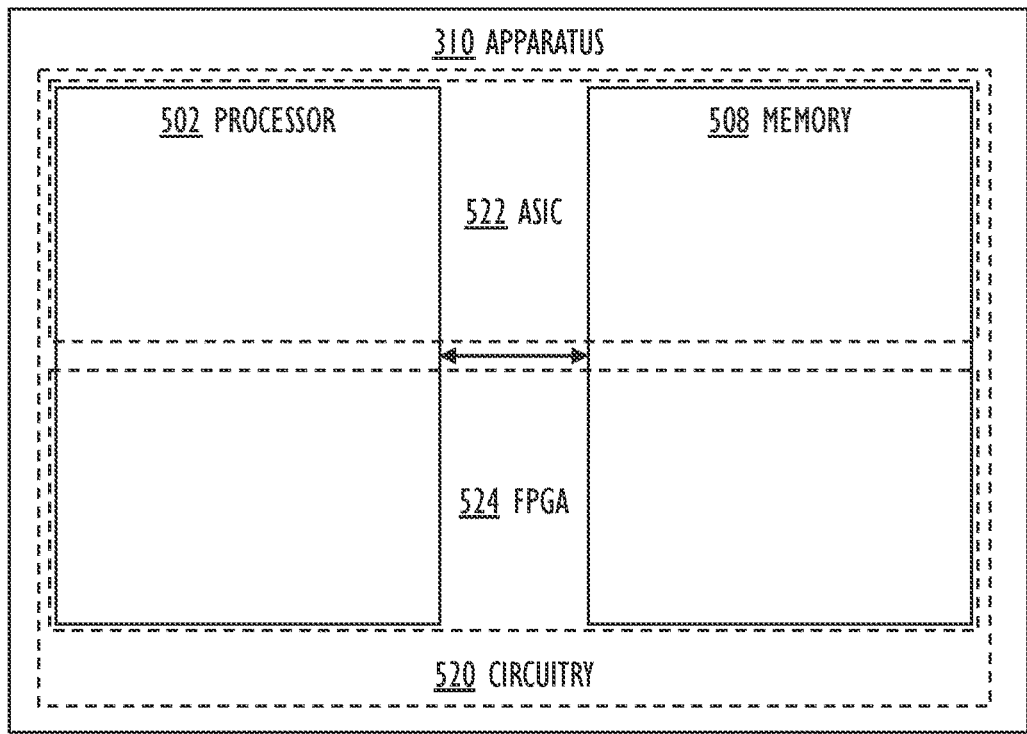

FIG. 5A and FIG. 5B illustrate examples of a cybersecurity apparatus 310, which is also illustrated in FIG. 3 as performing the operations of FIG. 1A and FIG. 1B.

The method described with reference to FIG. 1A and FIG. 1B may be implemented by the cybersecurity apparatus 310. The apparatus 310 may execute the operations defined in the method. The apparatus 310 may implement an algorithm, which includes at least the operations of the method, but may optionally include other operations related to the cybersecurity in general.

The apparatus 310 comprises one or more memories 508, and one or more processors 502 coupled to the one or more memories 508 configured to execute the operations described in FIG. 1A and FIG. 1B.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Java, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 310 (the computer program 510 may first be loaded into the one or more microprocessors 504 as the instructions 506 and then executed by one or more microprocessors 504), causes the apparatus 310 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 310. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 310, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figures 6, 7:
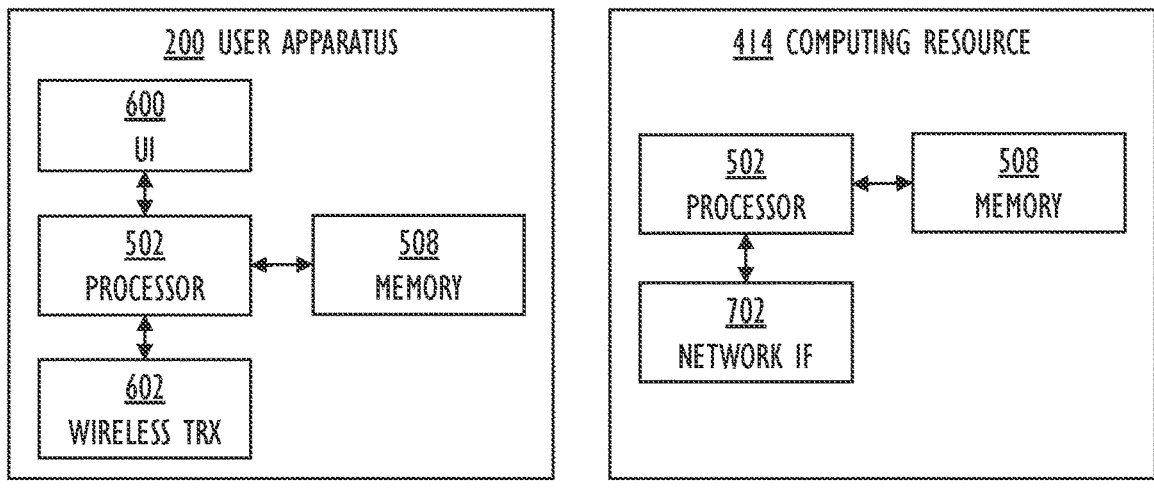
FIG. 6 is a block diagram illustrating an example of a user apparatus.
FIG. 7 is a block diagram illustrating an example of a computing resource.

FIG. 6 illustrates an example of a user apparatus 200 as the apparatus 310. The user apparatus 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, a game terminal, or some other type of a wired or wireless mobile or stationary communication device operating with or without a subscriber identification module (SIM) or an eSIM (embedded SIM). As shown in FIG. 6, the user apparatus 200 comprises the one or more memories 508, and the one or more processors 502 coupled to the one or more memories 508 configured to carry out the method/algorithm. In addition, the user apparatus 200 comprises a user interface 600 (such as a touch screen), and one or more wireless transceivers (such as a WLAN transceiver, a cellular radio network transceiver, and a short-range radio transceiver) 602. As shown in FIG. 2 and FIG. 4, the user apparatus 200A, 2006, may be running a cybersecurity application 206, 206A, 206B.

FIG. 7 illustrates an example of a computing resource 414 such as a server apparatus as the apparatus 310. The server apparatus 414 may be a networked computer server, which interoperates with the user apparatus 200A, 200B and/or with the CPE 402 according to a client-server architecture, a cloud computing architecture, a peer-to-peer system, or another applicable distributed computing architecture. As shown in FIG. 7, the server apparatus 414 comprises the one or more memories 508, and the one or more processors 502 coupled to the one or more memories 508 configured to carry out the method/algorithm. In addition, the server apparatus 414 comprises a network interface (such as an Ethernet network interface card) 702 configured to couple the server apparatus 414 to the Internet 410. As shown in FIG. 4, the computing resource 414 may be running a cybersecurity application 416, such as a cybersecurity server application 416.

Figure 8A:
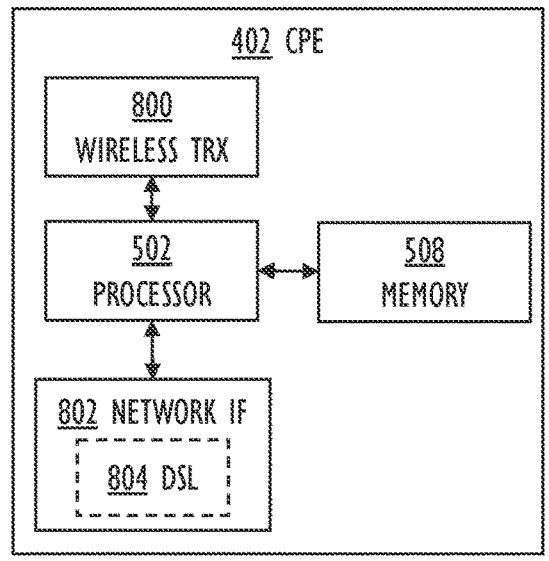
FIG. 8A and FIG. 8B are block diagrams illustrating examples of a customer-premises equipment.
Figure 8B:
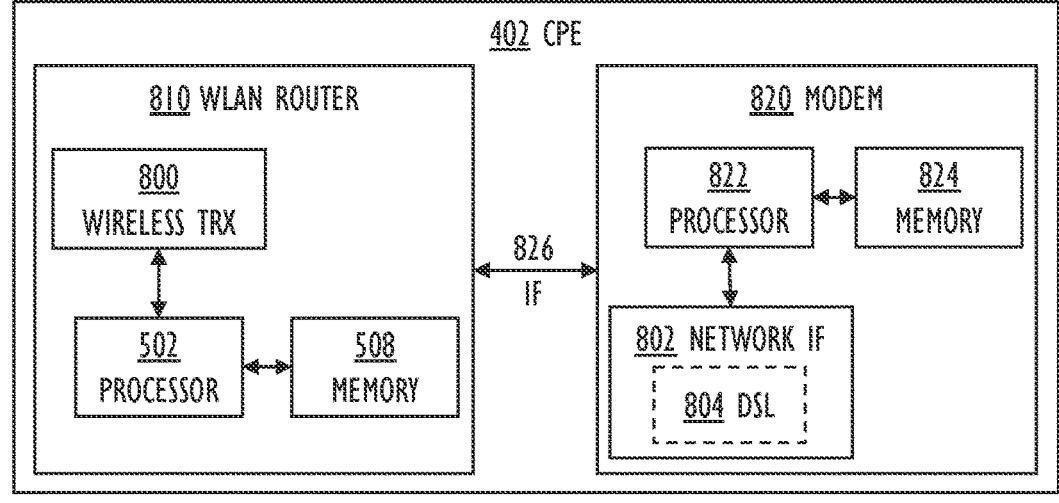

FIG. 8A and FIG. 8B illustrate examples of a customer-premises equipment 402 as the apparatus 310.

In FIG. 8A, the CPE 402 is an integrated apparatus comprising the one or more memories 508, and the one or more processors 502 coupled to the one or more memories 508 configured to carry out the method/algorithm. Additionally, the CPE 402 comprises a wireless radio transceiver 800 configured to create the WLAN 406 for enabling access by the user apparatus 200A. The CPE 402 also comprises a network interface 802 to act as a modem configured to connect to the telecommunication circuit of the carrier at the demarcation point. The network interface 802 may operate as a DSL (Digital Subscriber Line) modem 804 using different variant such as VDSL (Very high-speed DSL), SDSL (Symmetric SDL), or ASDL (Asymmetric DSL). As shown in FIG. 4, the CPE 402 may be running a cybersecurity application 404, such as a cybersecurity client application 404.

In FIG. 8B, the CPE 402 is a two-part apparatus. A WLAN router part 810 comprises the one or more memories 508, the one or more processors 502 coupled to the one or more memories 508 configured to carry out the method/algorithm, and the wireless transceiver 800 to create the WLAN 406 for enabling access by the user apparatus 200A. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the user apparatus 200A to gain access to the method/algorithm, whereas the modem part 820 may be provided by carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 310, including the capability to carry out the method/algorithm, may be implemented in a centralized fashion by a stand-alone single physical unit, or alternatively in a distributed fashion using more than one communicatively coupled physical units.

These physical units comprise the user apparatus 200A at the home or office 400 running the cybersecurity application 206A with a home or office functionality, the user apparatus 200B on the move 420 running a cybersecurity application 206B with an on the move functionality, the CPE 402 running a cybersecurity client application 404, and the computing resource 414 running a cybersecurity server application 416. The method/algorithm operations may be implemented by one or more of these apparatuses 200A/200B/402/414 executing the cybersecurity applications 206A/206B/404/416.

As can be understood by the person skilled in the art, the method/algorithm operations may be distributed among the distributed software comprising the cybersecurity application 206A, 206B, the cybersecurity client application 404, and the cybersecurity server application 416 in numerous different configurations. In a first example, the cybersecurity application with the home functionality 206A communicates with the cybersecurity client application 404 and/or the cybersecurity server application 416 to implement the method/algorithm functionality. In a second example, the cybersecurity client application 404 communicates with the cybersecurity server application 416 to implement the method/algorithm functionality. In a third example, the cybersecurity application with the on the move functionality 206B communicates with the cybersecurity server application 416 to implement the method/algorithm functionality.

Thus, the cybersecurity application 206A, 206B may comprise a stand-alone functionality to carry out the method/algorithm, or a part of the functionality, augmented by functionality of the cybersecurity client application 404 and/or by a functionality of the cybersecurity server application 416. Alternatively, the cybersecurity client application 404 may comprise a stand-alone fashion to carry out the method/algorithm, or a part of the functionality augmented by the functionality of the cybersecurity server application 416. As an additional alternative, the cybersecurity server application 416 may comprise a stand-alone fashion to carry out the method/algorithm. The cybersecurity application 206A, 206B, and/or the cybersecurity client application 404 may operate as a frontend with a relatively limited resources as regards to the processor and memory, whereas the cybersecurity server application 416 may operate as a backend with a relatively unlimited resources as regards to the processor and memory, and the capability to serve a very large number of the user apparatuses 200A, 200B simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
   intercepting data transmitted in a data connection related to a current decentralized application running in a user apparatus, wherein the current decentralized application comprises a frontend implementing a web user interface for a user of the user apparatus, and a backend implemented as a smart contract;
   searching the data to identify a keyword in the data;
   determining, based on the keyword matching a keyword in a collection of keywords related to the current decentralized application, that the data relates to the current decentralized application;

in response to determining that the data relates to the current decentralized application, determining a reputation of a web object related to the frontend of the current decentralized application; and in response to determining that the reputation of the web object is malicious, blocking the data connection.

2. The method of claim 1, further comprising:

detecting an address of the web object from the data, wherein the frontend is running in the web object associated with the address; and wherein determining the reputation of the web object related to the frontend of the current decentralized application further comprises determining the reputation of the web object related to the frontend of the current decentralized application based on the address.

3. The method of claim 2, wherein the address comprises one or more of an internet protocol address, a fully qualified domain name, a universal resource locator, and a smart contract address.

4. The method of claim 1, wherein determining the reputation of the web object related to the frontend of the current decentralized application further comprises:

retrieving a retrieved reputation for the web object from a web object reputation database; and setting the reputation of the web object related to the frontend of the current decentralized application based on the retrieved reputation.

5. The method of claim 4, further comprising:

continuously updating, by a supervised machine learning algorithm using a training set comprising malicious web objects and trustworthy web objects, the web object reputation database.

6. The method of claim 5, further comprising:

collecting the malicious web objects using an open source intelligence.

7. The method of claim 1, wherein determining the reputation of the web object related to the frontend of the current decentralized application further comprises:

inspecting the smart contract; and in response to determining that the smart contract has been used to mint or buy one or more fungible tokens or non-fungible tokens with a past decentralized application, and that the current decentralized application is different from the past decentralized application, setting the reputation of the web object malicious.

8. The method of claim 1, further comprising:

subsequent to blocking the data connection, preventing a wallet connect request from the current decentralized application in the data to connect a cryptocurrency wallet of the user of the user apparatus to the web object related to the current decentralized application.

9. The method of claim 1, further comprising:

subsequent to blocking the data connection, preventing a sale transaction request from the current decentralized application in the data to sell a fungible token or a non-fungible token defined by the smart contract in a blockchain and accessible by a private key kept in a cryptocurrency wallet of the user of the user apparatus.

10. The method claim 1, further comprising:

in response to determining that the reputation of the web object is questionable, seizing the data connection; and transmitting, to a cybersecurity application running in the user apparatus, a warning related to the data connection of the current decentralized application.

11. The method of claim 10, further comprising:

receiving a response from the cybersecurity application; and based on the response, allowing the data connection or blocking the data connection.

12. The method of claim 1, further comprising:

in response to determining that the reputation of the web object is trustworthy, allowing the data connection.

13. An apparatus comprising:

one or more memories; and one or more processors coupled to the one or more memories configured to:

intercept data transmitted in a data connection related to a current decentralized application running in a user apparatus, wherein the current decentralized application comprises a frontend implementing a web user interface for a user of the user apparatus, and a backend implemented as a smart contract;

search the data to identify a keyword in data;

determine, based on the keyword matching a keyword in a collection of keywords related to the current decentralized application, that the data relates to the current decentralized application;

in response to determining that the data relates to the current decentralized application, determine a reputation of a web object related to the frontend of the current decentralized application; and in response to determining that the reputation of the web object is malicious, block the data connection.

14. The method of claim 1, wherein the collection of keywords is used by a JavaScript framework related to the current decentralized application.

15. The apparatus of claim 13, wherein the one or more processors coupled to the one or more memories further configured to:

detect an address of the web object from the data, wherein the frontend is running in the web object associated with the address; and wherein to determine the reputation of the web object related to the frontend of the current decentralized application further comprises to determine the reputation of the web object related to the frontend of the current decentralized application based on the address.

16. The apparatus of claim 15, wherein the address comprises one or more of an internet protocol address, a fully qualified domain name, a universal resource locator, and a smart contract address.

17. The apparatus of claim 13, wherein to determine the reputation of the web object related to the frontend of the current decentralized application further comprises:

to inspect the smart contract; and in response to determining that the smart contract has been used to mint or buy one or more fungible tokens or non-fungible tokens with a past decentralized application, and that the current decentralized application is different from the past decentralized application, to set the reputation of the web object malicious.

18. A non-transitory computer-readable medium comprising a computer program with instructions which, when executed by an apparatus, cause the apparatus to:

intercept data transmitted in a data connection related to a current decentralized application running in a user apparatus, wherein the current decentralized application comprises a frontend implementing a web user interface for a user of the user apparatus, and a backend implemented as a smart contract;

search the data to identify a keyword in data;

determine, based on the keyword matching a keyword in a collection of keywords related to the current decentralized application, that the data relates to the current decentralized application;

in response to determining that the data relates to the current decentralized application, determine a reputation of a web object related to the frontend of the current decentralized application; and in response to determining that the reputation of the web object is malicious, block the data connection.

19. The medium of claim 18, wherein the apparatus is further caused to:

detect an address of the web object from the data, wherein the frontend is running in the web object associated with the address; and wherein to determine the reputation of the web object related to the frontend of the current decentralized application further comprises to determine the reputation of the web object related to the frontend of the current decentralized application based on the address.

20. The medium of claim 18, wherein to determine the reputation of the web object related to the frontend of the current decentralized application further comprises:

to inspect the smart contract; and in response to determining that the smart contract has been used to mint or buy one or more fungible tokens or non-fungible tokens with a past decentralized application, and that the current decentralized application is different from the past decentralized application, to set the reputation of the web object malicious.

\* \* \* \* \*